United States Patent [19]

Grant

[11] Patent Number: 4,991,041
[45] Date of Patent: Feb. 5, 1991

[54] APPARATUS FOR MOVING A CASSETTE BETWEEN STORAGE AND RECEIVING LOCATIONS

[75] Inventor: Frederic F. Grant, Bellflower, Calif.

[73] Assignee: Datatape Incorporated, Pasedena, Calif.

[21] Appl. No.: 360,956

[22] Filed: Jun. 2, 1989

[51] Int. Cl.⁵ ............................................. G11B 15/68
[52] U.S. Cl. .................................................... 360/92
[58] Field of Search ................................... 360/92, 71

[56] References Cited

U.S. PATENT DOCUMENTS

| | | | |
|---|---|---|---|
| 3,525,086 | 8/1970 | Lichowsky | 340/174.1 |
| 3,592,975 | 7/1971 | Ban | 179/100.2 Z |
| 3,631,426 | 12/1977 | Appelt | 340/174.1 B |
| 3,774,915 | 11/1973 | Kozu et al. | 274/4 F |
| 3,886,591 | 5/1975 | Bettini | 360/92 |
| 3,956,768 | 5/1976 | Covington | 360/92 |
| 4,063,294 | 12/1977 | Burkhart | 360/92 |
| 4,133,013 | 1/1979 | Fisher | 360/92 |
| 4,164,765 | 8/1979 | Gusling | 360/92 |
| 4,287,541 | 9/1981 | Tanahashi et al. | 360/92 |
| 4,742,405 | 5/1988 | Teranishi | 360/92 |

Primary Examiner—Robert S. Tupper
Attorney, Agent, or Firm—William F. Noval

[57] ABSTRACT

Disclosed is a magnetic tape cassette handling apparatus which is compact and reliable and which handles cassettes gently and firmly. The handling apparatus includes (a) a pusher member for gently moving a cassette forwardly into a cassette receiving location, and (b) clamping members for firmly clamping a cassette while moving the cassette rearwardly out of the cassette receiving location. The cassette handling apparatus is preferably located in a central opening of a cassette storage ferris wheel structure which is mounted adjacent to a magnetic tape recorder/player. Thus, the cassette handling apparatus loads and unloads a cassette from the ferris wheel structure into and out of the magnetic tape recorder/player.

1 Claim, 6 Drawing Sheets

APPARATUS FOR MOVING A CASSETTE BETWEEN STORAGE AND RECEIVING LOCATIONS

BACKGROUND OF THE INVENTION

This invention relates in general to magnetic tape cassette recorder/players and, more particularly, to a magnetic tape cassette recorder/player having a magnetic tape cassette handling apparatus which is reliable and compact and which handles cassettes gently and firmly.

In many applications, it is desirable to store a large amount of information on electronic media, such as to store analog or digital information on a plurality of magnetic tape cartridges or cassettes. Various types of storage systems have been proposed for storing a number of magnetic tape cassettes close to a magnetic tape recorder/player, so that individual cassettes are easily accessed by the recorder/player. In one such storage system, a plurality of magnetic tape cassettes are stacked in a vertical magazine adjacent to a magnetic tape recorder/player. Such storage systems are disclosed in U.S. Pat. No. 3,886,591, issued May 27, 1975, Inventor Bettini; U.S. Pat. No. 4,133,013, issued Jan. 2, 1979, Inventor Fisher; and U.S. Pat. No. 3,956,768, issued May 11, 1976, Inventor Covington. Vertical stacking storage systems are disadvantageous for the following reasons: (1) the reels of magnetic tape in the cassettes are stored in a flat position, thus tending to cause sideways shifting of the tape pack against the reel flanges, which results in tape edge damage, causing tape transport difficulties and recorded information degradation; (2) access to an individual tape cassette is slow; and (3) storage of a large number of tape cassettes requires the vertical dimension of the storage system to be unacceptably large.

In order to reduce the time for access to an individual magnetic tape cassette, various closed loop storage systems have been proposed. Thus, carousel type cassette storage systems are disclosed in U.S. Pat. No. 3,592,975, issued July 13, 1971, Inventor Ban; U.S. Pat. No. 3,631,426, issued Dec. 28, 1971, Inventor Appelt; U.S. Pat. No. 3,774,915, issued Nov. 27, 1973, Inventors Kozu et al; and U.S. Pat. No. 4,164,765, issued Aug. 14, 1979, Inventor Gysling. The systems disclosed in these patents includes a carousel type storage structure which store a plurality of cassettes in circumferentially spaced, horizontally disposed compartments. Since the cassettes are stored with the reels on edge, edge damage to the tape during storage is minimized. In the latter three patents, an elevator mechanism is used to load and unload a cassette into a magnetic tape transport station. In the former patent, the magnetic tape transport is moved into and out of contact with a cassette which remains in its storage compartment. An analogous system is disclosed in U.S. Pat. No. 4,063,294, issued Dec. 13, 1977, Inventor Burkhart, which discloses a carousel like conveyor storage system. A tape cartridge transfer mechanism is located adjacent a magnetic transducing station. The storage systems disclosed in these five patents are disadvantageous either because of the use of a cassette loading station located adjacent to the storage structure which is relatively complex and space consuming or the use of a complex and expensive, movable tape transport.

Ferris wheel type cassette storage systems are disclosed in U.S. Pat. No. 3,525,086, issued Aug. 18, 1970, Inventor Lichowsky, and U.S. Pat. No. 4,287,541, issued Sept. 1, 1981, Inventors Tanahashi et al. The system disclosed in the latter patent is disadvantageous because of the complex and space consuming, side loading cassette loading device which loads a cassette into recording apparatus.

SUMMARY OF THE INVENTION

According to the present invention, there is provided a magnetic tape cassette handling apparatus which obviates the disadvantages of known tape cassette handling apparatus. According to an aspect of the present invention, there is provided magnetic tape cassette handling apparatus which is compact and reliable and which handles cassettes gently and firmly. The cassette handling apparatus includes a pusher member for gently moving a cassette forwardly into a cassette receiving location and clamping members for firmly clamping a cassette while moving the cassette rearwardly out of the cassette receiving location. According to another feature of the present invention, the cassette handling apparatus is preferably located in a central opening of a cassette storage ferris wheel structure which is mounted adjacent to a magnetic tape recorder/player. The handling apparatus loads and unloads a magnetic tape cassette from the ferris wheel storage structure into and out of a magnetic tape recorder/player.

BRIEF DESCRIPTION OF THE DRAWINGS

In a detailed description of the preferred embodiments of the invention presented below, reference is made to the accompanying drawings in which like numerals refer to like elements.

DESCRIPTION OF THE PREFERRED EMBODIMENTS

Figure 1:
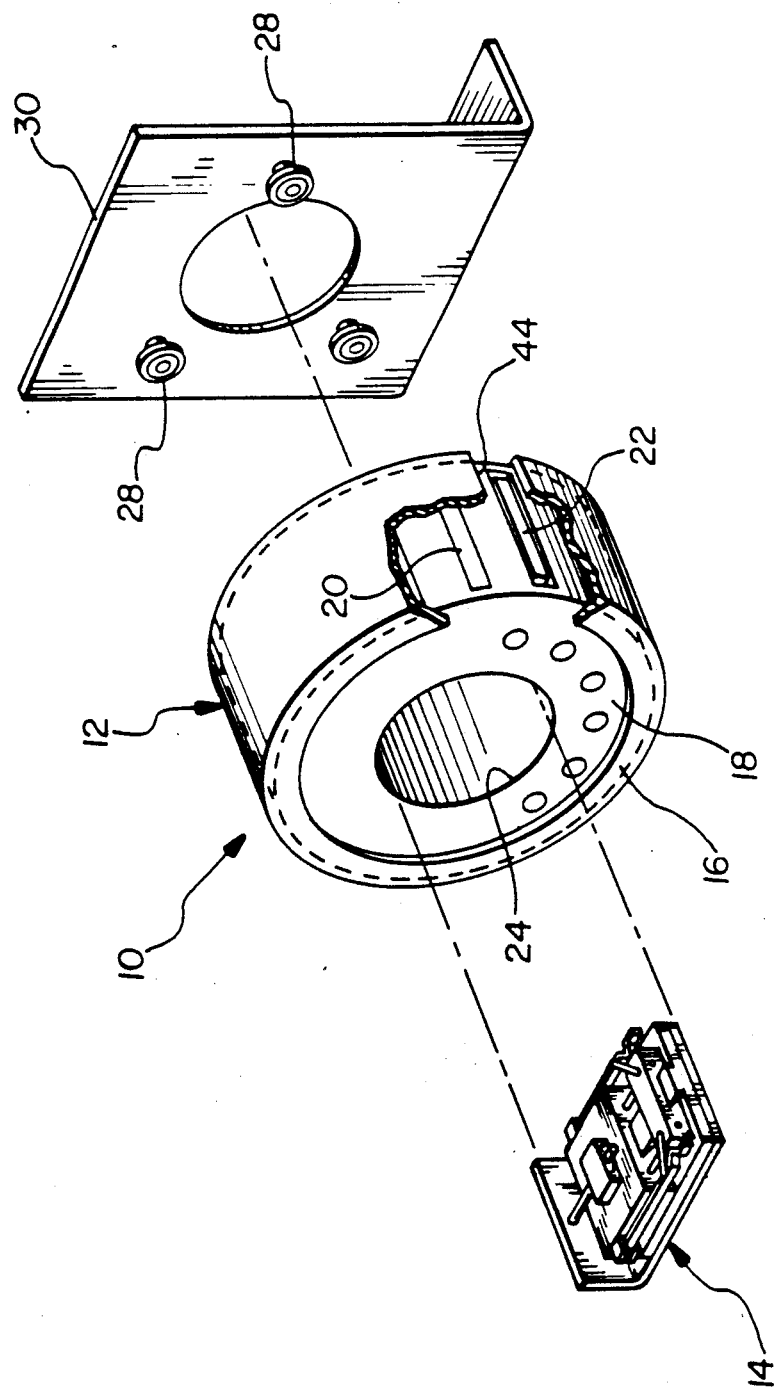
FIG. 1 is a diagrammatic perspective view of an embodiment of the present invention.
Figure 2:
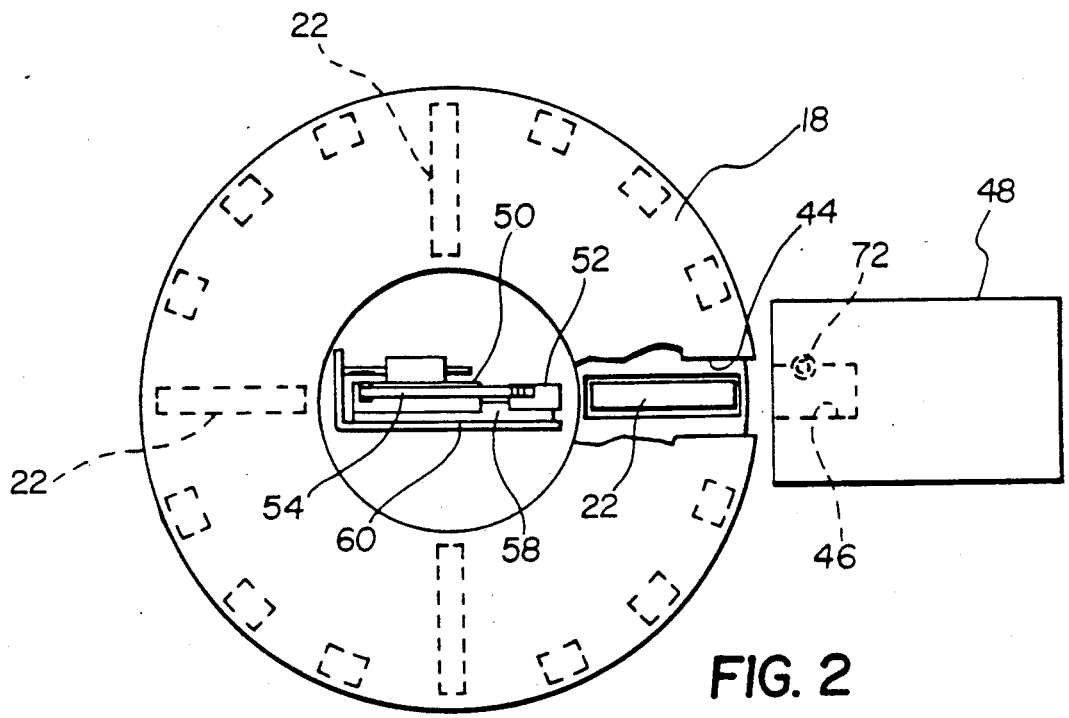
FIG. 2 is an elevational view of the embodiment of FIG. 1.
Figure 3:
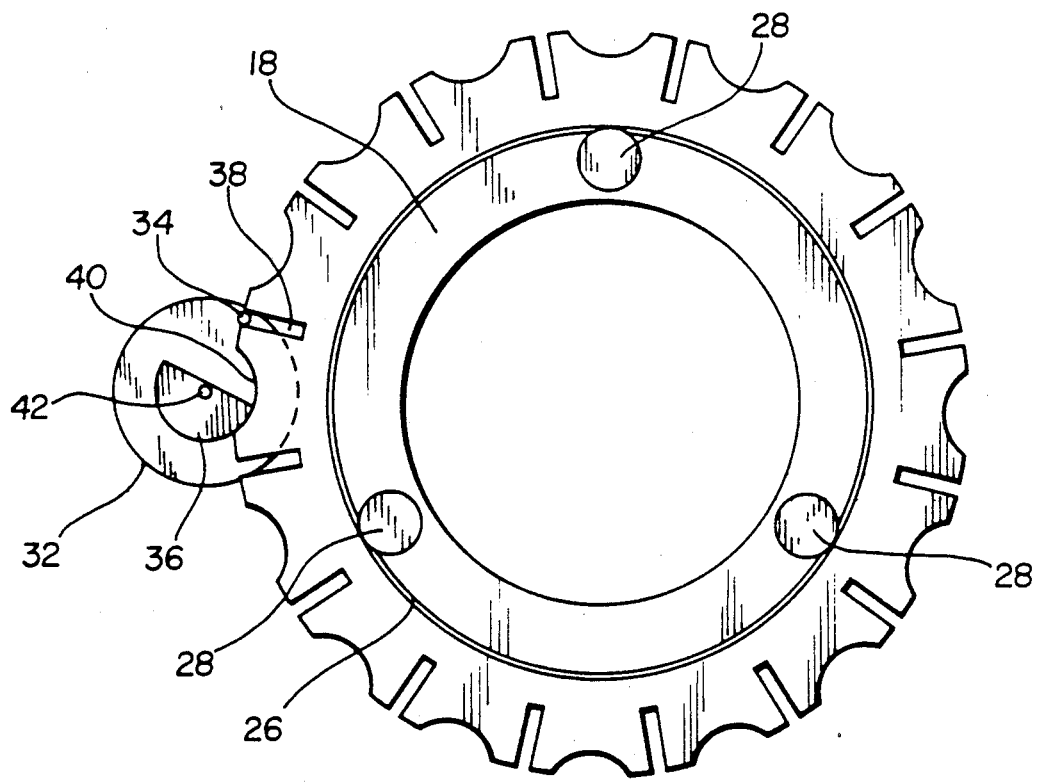
FIG. 3 is a diagrammatic view showing a drive system for rotation of the embodiment of FIG. 1.

Referring now FIGS. 1 and 2, there is described a preferred embodiment of the present invention. As shown, magnetic tape cassette storage and handling apparatus 10 includes a ferris wheel tape cassette storage structure 12 and cassette handling device 14. Structure 12 includes an annular outer member 16 and an inner member 18 having a plurality of circumferentially spaced, radially extending compartments 20 for storing magnetic tape cassettes 22.

Member 18 has a central opening 24 in which is located cassette handling device 14. Member 18 has a support ring 26 which is mounted for rotation about a horizontal axis on grooved guide rollers 28 journaled on stationary support member 30. A drive mechanism for rotating cassette storage member 18 includes a wheel 32 having a pin 34 and a semi-circular member 36. Pin 34 engage radial slots 38 in the periphery of ring member 26 and semi-circular member 36 engages arcuate slots 40 on the periphery of ring member 26. There are as many slots 38 and slots 40 around the periphery of member 26 as there are cassette storage compartments 20 in member 18. Members 32 and 36 are rotatable about an axis 42 by means of a motor or the like (not shown).

When storage member 18 is stationary, semi-circular member 36 nests in slot 40 of ring 26 to prevent rotation of storage member 18. Rotation of member 32 causes pin 34 to be rotated into a slot 38. As member 32 continues to rotate, pin 34 rotates storage member 18 to step, the next compartment 20 containing a magnetic tape cassette, into alignment with slot 44 in annular member 16. Slot 44 is adjacent to cassette loading slot 46 of magnetic tape recorder/player 48 (FIG. 2). Sensors may be provided to sense the presence or absence of a cassette 22 in compartment 20. As member 32 continues to rotate, pin 34 will disengage from slot 38 and member 36 will engage the a slot 40, to hold storage member 18 stationary during unloading or loading of a cassette 22.

Figure 4:
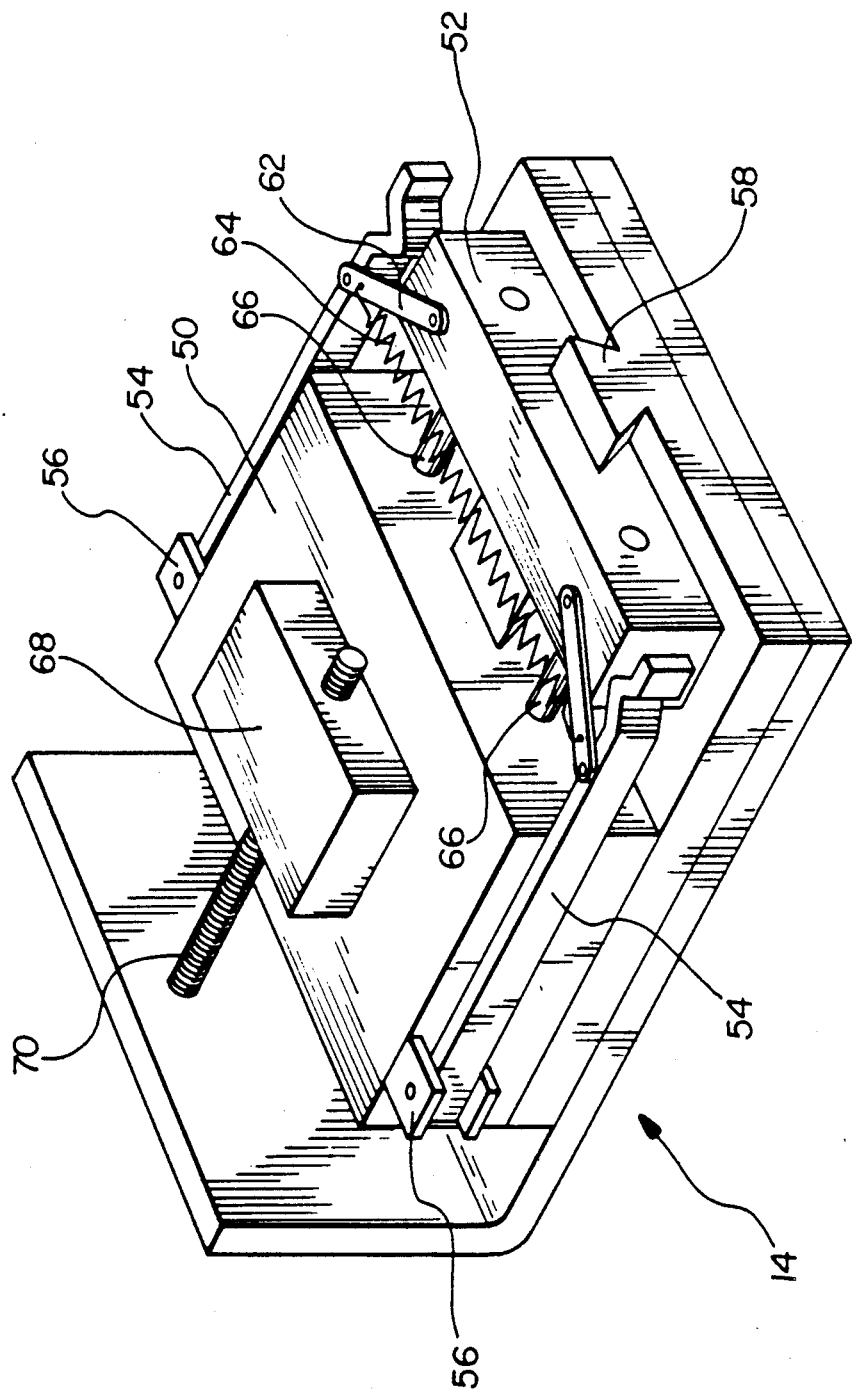
FIG. 4 is a perspective view of the cassette handling device of the embodiment of FIG. 1, and FIGS. 5, 6 and 7 are top plan views which are useful in describing the operation of the cassette handling device of the embodiment of FIG. 1.

As shown, more particularly, in FIG. 4, cassette handling apparatus 14 includes a slide member 50, a pusher member 52 and clamping members 54. Members 54 are pivotally mounted on either side of member 50 by brackets 56. Members 50 and 52 are slidably mounted on dovetail guide member 58 which is mounted on L-shape bracket 60. Linkages 62 pivotally connect members 54 to pusher member 52 and are biased together by means of tension spring 64.

Members 50 and 52 are linked together by means of slidable pins 66. Cassette handler 14 is driven by means of a motor 68 mounted on member 50. Motor 68 has a screw shaft 70 which is connected at one end to bracket 60. Actuation of motor 68 causes linear actuation of shaft 70, which effects reciprocal movement of member 50.

Figure 5:
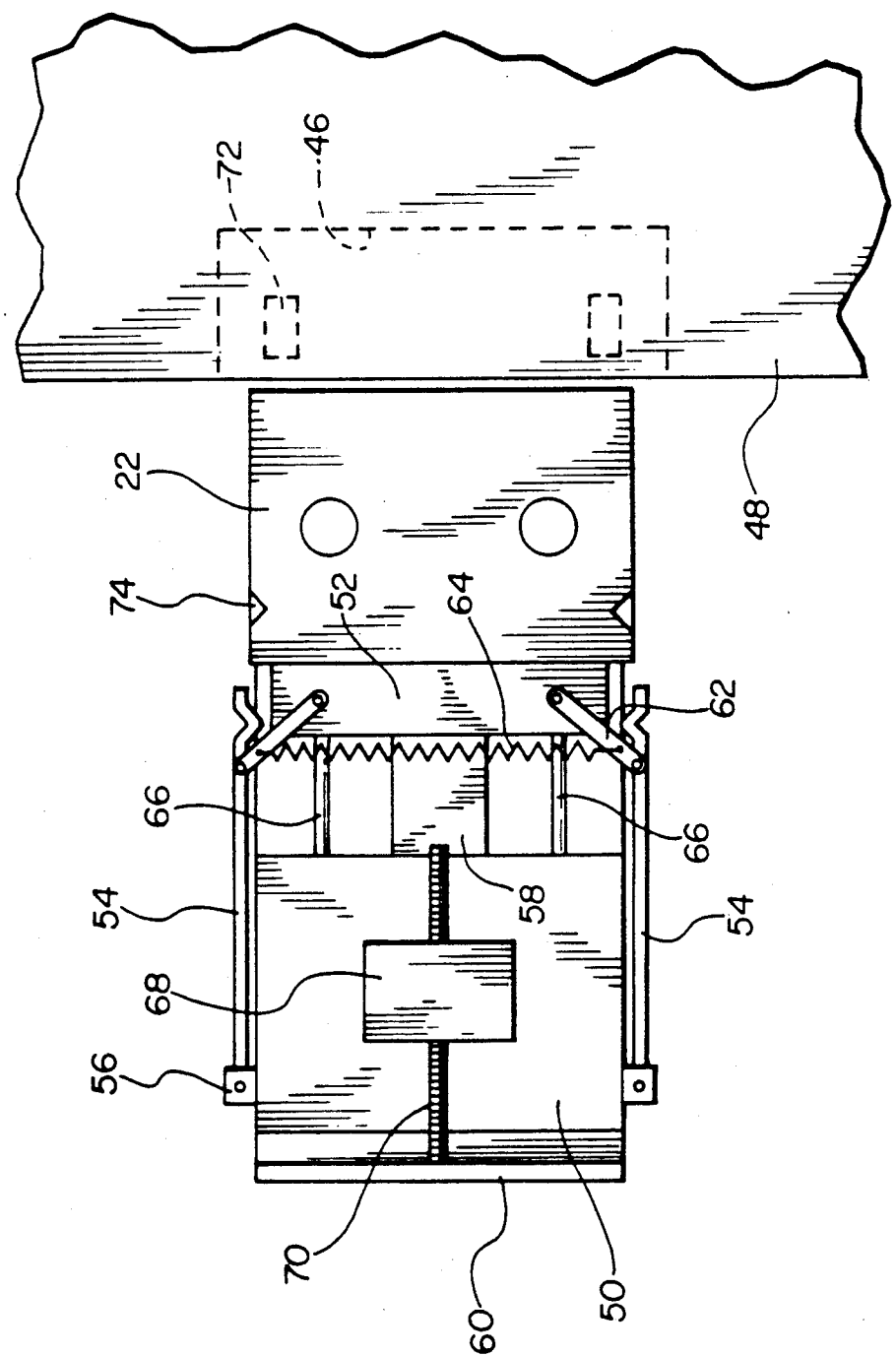
Figure 6:
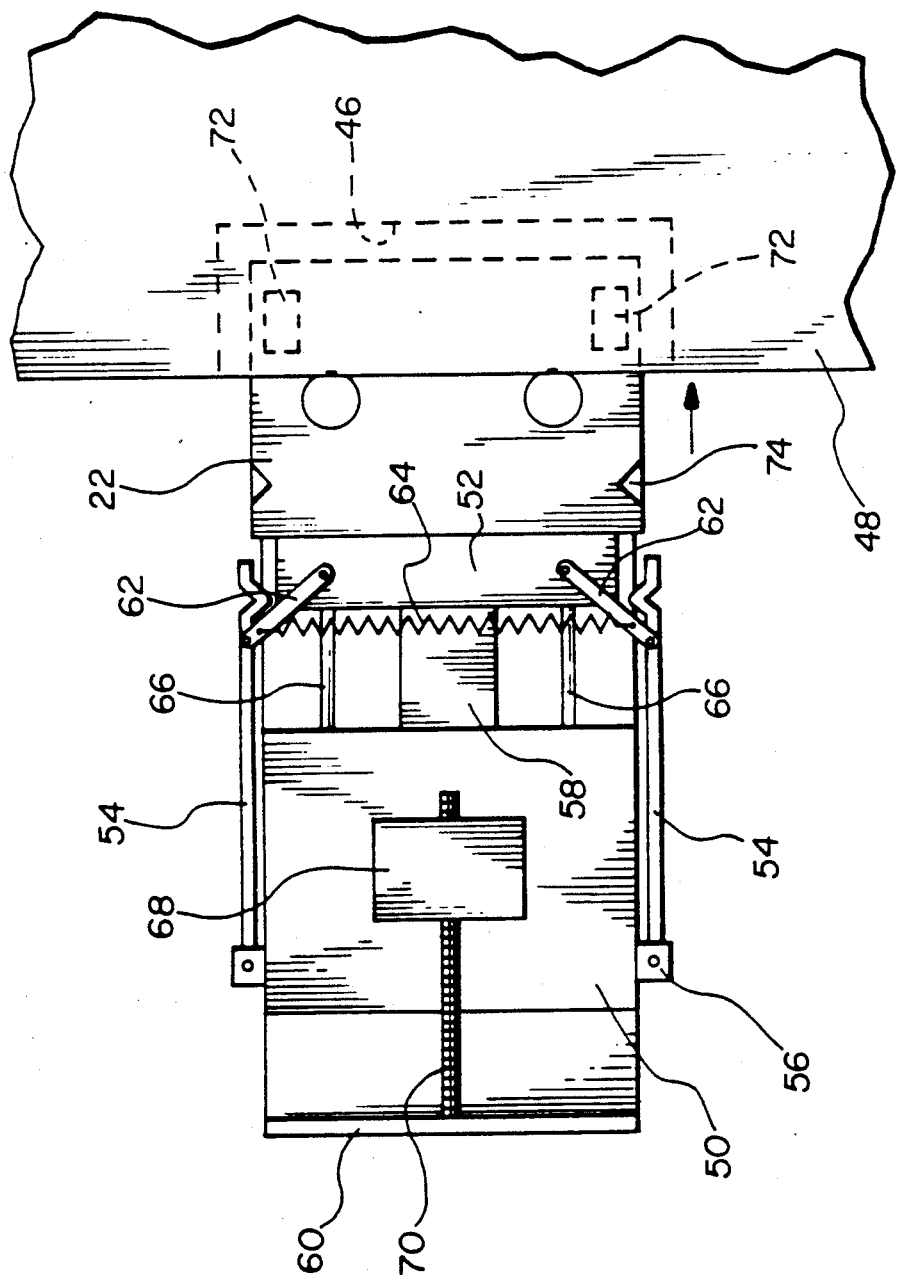
Figure 7:
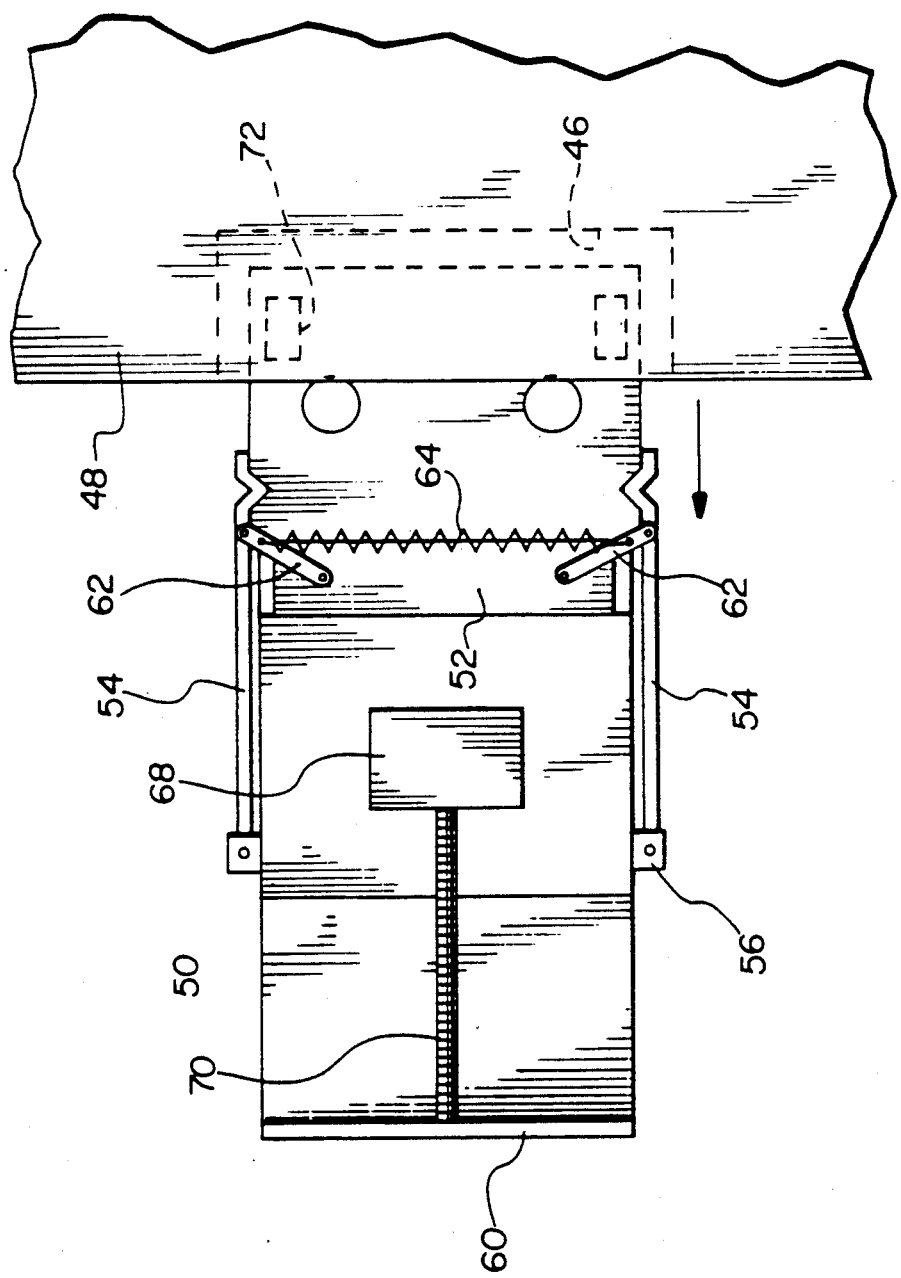

Referring now to FIGS. 5, 6 and 7, there is described, the operation of cassette handling apparatus 14 in unloading and loading a magnetic tape cassette 22 from a compartment 20 of member 18, into and out of recorder/player 48. As shown in FIG. 5, members 54 are retracted and pusher member 52 contacts a cassette 22 in alignment with loading slot 46 of cassette recorder 48. As shown in FIG. 6, motor 68 has been actuated to drive members 50 and 52 along guide 58 to gently move cassette 22 forwardly out of compartment 20 into loading slot 46 of magnetic tape recorder/player 48. Magnetic tape recorder/player 48 has a loading mechanism having rollers 72. Rollers 72 move cassette 22 completely into recorder/player 48. After a cassette 22 has been removed from its compartment 20 in member 18, motor 62 is actuated to withdraw members 50 and 52 to the position shown in FIG. 5.

After a cassette has been unloaded from recorder/player 48, motor 62 is actuated to move member 52 into contact with cassette 22. Further actuation of motor 62, (a) causes member 50 to close on member 52, (b) toggles forward clamping members 54, so that V-shaped ends of members 54 engage notches 74 in cassette 22. Spring 64 biases members 54 to positively clamp cassette 22.

Motor 62 is reversed to cause handler 14 to firmly move cassette 22 rearwardly back into compartment 20 in ferris wheel structure 12. By providing a stop (not shown) for member 52, motor 68 drives member 50 away from member 52 and toggles members 54 out of contact with cassette 22. Continued actuation of motor 62 returns the cassette handler 14 to the position shown in FIG. 5.

The invention has been described in detail with particular reference to preferred embodiments thereof, but it will be understood that variations and modifications can be effected within the scope and spirit of the invention.

What is claimed is:

1. In a magnetic tape cassette system having a cassette storage location and a cassette receiving location, magnetic tape cassette handling apparatus comprising:

pushing means located adjacent to said cassette storage location for pushing a cassette;

a slide member spaced from said pushing means;

a pair of clamping members for clamping a cassette, said clamping members being pivotally mounted on said slide member and being pivotally linked to said pushing means;

means for biasing said clamping members together;

means for movably mounting said pushing means and said slide member; and actuating means coupled to said slide member for causing said slide member and said pushing means (1) to move in a first direction wherein said pushing means moves a cassette between a storage location and said cassette receiving location, wherein said pushing means and said slide member are spaced apart and said clamping members are retracted out of clamping engagement with said cassette, and (2) to move in a second opposite direction, wherein said pushing means and said slide members are moved adjacent to one another and said clamping members are extended to clamp a cassette located at said receiving location, so as to move said cassette between said receiving location and a cassette storage location.

* * * * *